W. A. SETTLE.
BICYCLE AND MOTOR CYCLE HOLDER.
APPLICATION FILED MAR. 10, 1909.
948,349.
Patented Feb. 8, 1910.
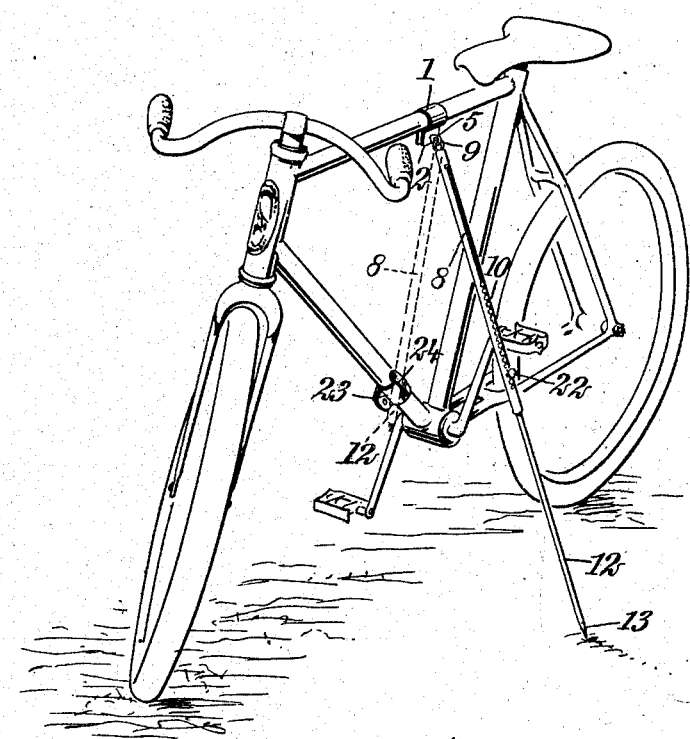
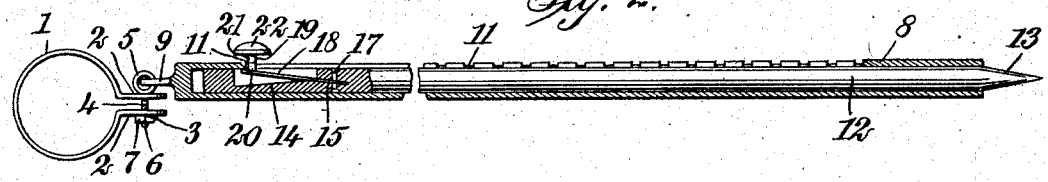
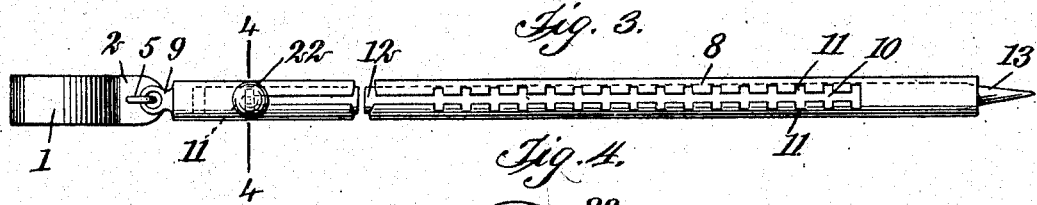
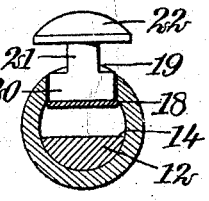
WITNESSES
INVENTOR
Walter A. Settle
BY
ATTORNEYS

UNITED STATES PATENT OFFICE.

WALTER ALLEN SETTLE, OF WALLACE, IDAHO.

BICYCLE AND MOTOR-CYCLE HOLDER.

948,349.  Specification of Letters Patent.  Patented Feb. 8, 1910.

Application filed March 10, 1909. Serial No. 482,418.

*To all whom it may concern:*

Be it known that I, WALTER ALLEN SETTLE, a citizen of the United States, and a resident of Wallace, in the county of Shoshone and State of Idaho, have invented a new and Improved Bicycle and Motor-Cycle Holder, of which the following is a full, clear, and exact description.

This invention relates to bicycle and motor cycle holders, and more particularly such as are adapted to be carried in an inoperative position on the bicycle or motor cycle when not in use, and each of which includes an adjustable support, means for securing one end of the support to the frame of a bicycle or motor cycle, and further means adapted to engage the other end of the support to hold the latter, when in an inoperative position, out of the way of the rider.

The object of the invention is to provide a device of the class described, simple and efficient in construction and inexpensive to manufacture, which is adapted to be permanently carried on the frame of the bicycle or motor cycle, and which can be easily adjusted to hold the bicycle or motor cycle in an upright position when not being ridden, the support being adjustable to engage one of the pedals of the bicycle or motor cycle, so that the latter will be firmly held against movement should the bicycle or motor cycle be in a standing position on a grade.

Reference is to be had to the accompanying drawings forming a part of this specification, in which similar characters of reference indicate corresponding parts in all the views.

Figure 1 is a perspective view of an embodiment of my invention, showing the same supporting a bicycle in an upright position, and showing, in the dotted outline, the device held in an inoperative position; Fig. 2 is an enlarged longitudinal sectional view of the invention; Fig. 3 is an enlarged plan view; and Fig. 4 is an enlarged cross section on the line 4—4 of Fig. 3.

In the specific form shown in the drawings, I provide a collar or bracket 1 of any suitable spring metal, which is adapted to be arranged on one of the frame members of a bicycle, as shown most clearly in Fig. 1 of the drawings. The collar is provided with two substantially parallel extensions 2 having registering openings 3. Adapted to be received by these openings is a bolt 4 having one end formed into an eye 5 and having the other end 6 suitably threaded to receive a correspondingly threaded nut 7, the latter serving to removably lock the collar on the frame of the bicycle.

The support consists of a hollow sleeve 8 having an eye 9 at one end adapted to be received by the eye 5 of the bolt 4, so that the sleeve is movably secured to the collar. The sleeve further has a slot 10 which is provided with a plurality of oppositely disposed notches 11, for a purpose to be hereinafter described. Adapted to be slidably arranged within the sleeve 8 is a supporting member 12 having its outer end 13 suitably tapered for engaging the ground. This supporting member has near the opposite end, a recess 14, the latter having its bottom inclined, as shown most clearly in Fig. 2. Located in the recess and extending into the opening 15 in the member, and secured in place by means of a rivet 17 or the like, is a resilient member 18.

Arranged near the free end of the member 18 is a stud 19 having a laterally extended body 20, the latter being provided with a neck 21. Mounted on the neck is a head or button 22 whereby the resilient member may be manually depressed into the inclined recess, the body 20 serving to engage the notches 11 of the slot 10 until thus depressed.

In adjusting this device, it is only necessary to depress the resilient member until the body 20 is out of engagement with the notches and then slide the supporting member to the desired point, when the button 22 can be released to allow the body of the stud to once more engage the adjacent notches.

I further provide a movable bracket 23 adapted to be secured to one of the frame members of the bicycle and having a spring clip, 24, the latter serving to receive the support when the latter is not in use, so that it may be held in an inoperative position, out of the way of the rider. When thus held, the supporting member 12 is drawn up within the sleeve, in which position it is held by means of the body of the stud engaging the notches at the end of the slot.

When the device is being used to hold a bicycle on a hill or other grade, the rear of the sleeve is brought into engagement with the pedal when the latter is in a horizontal position, so that the bicycle will be firmly held against forward movement, as shown most clearly in Fig. 1 of the drawings.

Having thus described my invention, I claim as new and desire to secure by Letters Patent:—

A device of the class described, comprising a bracket or collar for attachment to the bicycle, a hollow sleeve having at one end an eye, a screw eye connecting the eye of the sleeve with the bracket, said sleeve having a longitudinal slot whose side edges are notched at spaced intervals, the notches of one edge registering with the notches of the other edge, a supporting member slidable in the sleeve and provided at its inner end with a recess, a spring secured by one end within the recess and provided at the other with a button projecting through the slot, said button having a laterally extended body for engaging the notches for retaining the supporting member in adjusted position with respect to the slot.

In testimony whereof I have signed my name to this specification in the presence of two subscribing witnesses.

WALTER ALLEN SETTLE.

Witnesses:
W. A. SMITH,
J. CARY EDWARDS.